US009441344B2

(12) United States Patent
Tanaka et al.

(10) Patent No.: US 9,441,344 B2
(45) Date of Patent: Sep. 13, 2016

(54) CONTROLLER ASSEMBLY, CAB FOR WORK MACHINE, AND WORK MACHINE

(71) Applicant: KOMATSU LTD., Tokyo (JP)

(72) Inventors: Hiroaki Tanaka, Hirakata (JP);
Daisuke Tsukamoto, Hirakata (JP);
Hirokazu Sugimoto, Hirakata (JP);
Tomoyuki Imada, Hirakata (JP);
Yoshiaki Honma, Hirakata (JP)

(73) Assignee: KOMATSU LTD., Tokyo (JP)

( * ) Notice: Subject to any disclaimer, the term of this patent is extended or adjusted under 35 U.S.C. 154(b) by 16 days.

(21) Appl. No.: 14/237,201

(22) PCT Filed: Jul. 16, 2013

(86) PCT No.: PCT/JP2013/069247
§ 371 (c)(1),
(2) Date: Feb. 5, 2014

(87) PCT Pub. No.: WO2014/112139
PCT Pub. Date: Jul. 24, 2014

(65) Prior Publication Data
US 2014/0232130 A1 Aug. 21, 2014

(30) Foreign Application Priority Data
Jan. 18, 2013 (JP) .................................. 2013-007496

(51) Int. Cl.
*E02F 9/16* (2006.01)
*E02F 9/20* (2006.01)
(Continued)

(52) U.S. Cl.
CPC .......... *E02F 9/2004* (2013.01); *B60H 1/00378* (2013.01); *E02F 9/0858* (2013.01); *E02F 9/16* (2013.01); *E02F 9/163* (2013.01); *B60H 2001/00228* (2013.01)

(58) Field of Classification Search
CPC ......... E02F 9/0858; E02F 9/16; E02F 9/163; E02F 9/2004; B60H 1/00378; B60H 1/00407; B60H 1/00207; B60H 2001/00228
USPC .............. 454/141; 296/24.3, 190.01, 190.08, 296/190.09, 191; 248/310
See application file for complete search history.

(56) References Cited

U.S. PATENT DOCUMENTS 4,072,487 A * 2/1978 Irwin ............................... 62/244
5,308,279 A * 5/1994 Grinberg ........................ 454/139
(Continued)

FOREIGN PATENT DOCUMENTS

CN 101338570 A 1/2009
CN 101446096 A 6/2009
(Continued)

OTHER PUBLICATIONS

English Machine Translation of JP2003200862A, Kondo, Jul. 2003.*

*Primary Examiner* — Gregory Huson
*Assistant Examiner* — Dana Tighe
(74) *Attorney, Agent, or Firm* — Drinker Biddle & Reath LLP (57) ABSTRACT

A controller assembly includes a base plate, a bracket, and a first controller main body. The base plate includes a through hole and a frame having an upper surface and a lower surface and surrounding the through hole. The bracket has first and second flange portions supported on the upper surface of the frame at positions opposite to each other over the through hole, first and second side portions coupled respectively to the first and second flange portions and passing through the though hole; and a bottom portion coupled to both of the first and second side portions on the side of the lower surface of the frame. The first controller main body is mounted on a bottom portion of the bracket. Accordingly, a controller assembly which can be readily assembled, a cab of a work implement, and a work machine can be obtained.

5 Claims, 9 Drawing Sheets

(51) Int. Cl.
   *E02F 9/08* (2006.01)
   *B60H 1/00* (2006.01)

(56) References Cited

U.S. PATENT DOCUMENTS

| | | | |
|---|---|---|---|
| 6,206,457 B1 * | 3/2001 | Sakyo et al. | 296/190.08 |
| 2010/0297926 A1 | 11/2010 | Shimomura et al. | |

FOREIGN PATENT DOCUMENTS

| | | | |
|---|---|---|---|
| CN | 101922166 A | 12/2010 | |
| CN | 202644625 U | 1/2013 | |
| JP | H07-273478 A | 10/1995 | |
| JP | 2000-168342 A | 6/2000 | |
| JP | 2003200862 A * | 7/2003 | ............ B62D 33/06 |
| JP | 2005-163470 A | 6/2005 | |
| JP | 2006-002479 A | 1/2006 | |
| JP | 2009-001140 A | 1/2009 | |
| JP | 4291221 B2 | 7/2009 | |
| JP | 2010-095860 A | 4/2010 | |
| JP | 2010-270553 A | 12/2010 | |
| JP | 2012-241326 A | 12/2012 | |
| JP | 2012-241327 A | 12/2012 | |
| KR | 10-2005-0010397 A | 1/2005 | |

* cited by examiner

CONTROLLER ASSEMBLY, CAB FOR WORK MACHINE, AND WORK MACHINE

TECHNICAL FIELD

The present invention relates to a controller assembly, a cab for a work machine, and a work machine, and particularly to a controller assembly with a bracket and a controller main body mounted on the bracket, a cab for a work machine, and a work machine.

BACKGROUND ART

A work machine includes a work implement and a cab for an operator operating the work implement. The operator in the cab operates the work implement to perform a work with operation of the work implement.

Conventionally, as disclosed for instance in Japanese Patent Laying-Open No. 2009-1140 (PTD 1), an operator's seat is arranged in an internal space of a cab of a work machine, and an air conditioner unit and the like are arranged behind the operator's seat. Moreover, in recent years, a work machine is used which employs an information-oriented construction system performing position detection for a work implement with use of an information and communication technology (ICT), and operating or automatically controlling the work implement based on the position information of the detected work implement. According to this information-oriented construction system, a controller main body for processing the position information of the work implement is arranged in the internal space of the cab of the work machine.

CITATION LIST

Patent Document

PTD 1: Japanese Patent Laying-Open No. 2009-1140

SUMMARY OF INVENTION

Technical Problem

However, according to Japanese Patent Laying-Open No. 2009-1140, arrangement and assemblage of the controller main body for processing position information of the work machine and the work implement in the information-oriented construction system have not been considered at all.

The position information process controller described above generally is equipment additionally provided in a work machine as desired, and does not include an element directly operated by an operator. Further, a display presenting position information is provided in the cab, and it is necessary to connect the position information controller with the display. Therefore, this controller is desirably provided in the cab in the light of connection with the display and behind the operator's seat in the light of no need for operation. However, since a space for installation is narrow due to existing equipment (for example, air conditioner unit) provided behind the operator's seat, operation for installing an additional controller was not easy.

The present invention was achieved in view of the problem described above, and its object is to provide a controller assembly enabling easy additional installation utilizing existing equipment, a cab of a work machine, and a work machine.

Solution to Problem

A controller assembly of the present invention includes a base plate, a bracket, and a first controller main body. The base plate includes a through hole and a frame surrounding the through hole. The frame has an upper surface and a lower surface. The bracket includes first and second flange portions supported on the upper surface of the frame at positions opposite to each other over the through hole, first and second side portions coupled respectively to the first and second flange portions and passing through the through hole, and a bottom portion coupled to both of the first and second side portions on a side of the lower surface of the frame. The first controller main body is mounted on the bottom portion of the bracket.

According to the controller assembly of the present invention, the first and second flange portions are supported on the upper surface of the frame at positions opposite to each other over the through hole. The first and second side portions pass through the through hole. The bottom portion is coupled to both of the first and second side portions on the side of the lower surface of the frame. Therefore, the bottom portion of the bracket on which the controller main body is mounted can be inserted into the through hole of the base plate from the side of the upper surface of the frame. Thus, the bracket on which the controller main body is mounted is readily assembled to the base plate. Consequently, the controller assembly can be readily assembled. Further, since the bracket can be assembled to the base plate in the state where the base plate is mounted to a mounted body, the controller assembly can be readily assembled to the mounted body. Moreover, since a space can be provided on the upper side of the base plate, a limited space can be utilized effectively.

In the controller assembly described above, opposite ends of the bracket formed by the first and second flange portions, the first and second side portions, and the bottom portion are open in the direction opposite to each other. Therefore, the controller main body can be mounted to the bottom portion from the opened ends. Consequently, the controller main body can be readily mounted to the bottom portion.

In the controller assembly described above, a vibration damping member arranged between the controller main body and the bracket is further provided. Therefore, vibrations transmitted from the bracket to the controller main body can be suppressed by the vibration damping member. Consequently, the controller main body can be protected from the vibrations. Further, since the vibration damping member can be assembled as the controller assembly in advance and then mounted to the mounted body, assemblage can be readily performed.

In the controller assembly described above, a second controller main body is provided on the upper side of the frame. Accordingly, two controller main bodies can be readily mounted to the mounted body with use of one base plate.

A cab for a work machine of the present invention has an internal space in which an operator's seat to be seated by an operator is arranged, and the controller assembly described above is provided in the internal space. Therefore, a cab for a work machine can be provided which includes the controller main body in the internal space.

In the cab for a work machine described above, an air conditioner main body portion arranged behind the operator's seat is further provided in the internal space. The base plate of the controller assembly is mounted on the upper portion of the air conditioner main body portion. Therefore, the controller assembly can be mounted on the upper portion of the air conditioner main body portion arranged behind the operator's seat. Since a space is provided on the air conditioner main body portion arranged behind the operator's seat, the space in the internal space can be effectively utilized by arranging the controller assembly in this space.

A work machine of the present invention includes the cab for the work machine described above. A work machine including the cab for a work machine can be provided.

Advantageous Effects of Invention

As described above, according to the present invention, a controller assembly can be readily assembled.

DESCRIPTION OF EMBODIMENT

Hereinafter, an embodiment of the present invention will be described with reference to the drawings.

Firstly, a configuration of a work machine according to one embodiment of the present invention will be described. Hereinafter, a hydraulic excavator will be described as an example of a work machine to which the idea of the present invention is applicable.

Figure 1:
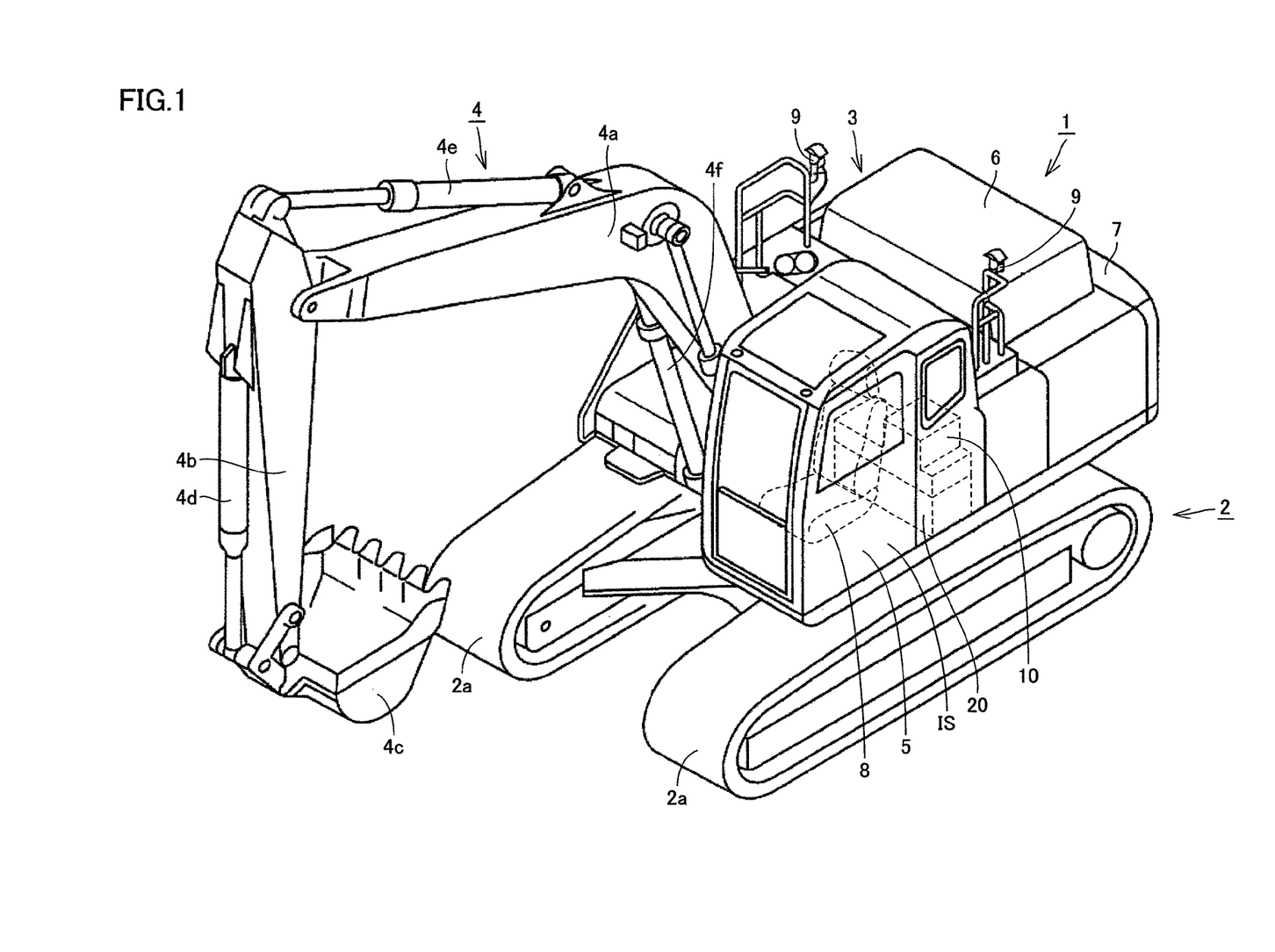
FIG. 1 is a perspective view schematically representing a configuration of a hydraulic excavator according to one embodiment of the present invention.

Referring to FIG. 1, a hydraulic excavator 1 mainly includes a lower traveling unit 2, an upper revolving unit 3, a work implement 4, a controller assembly 10, and an air conditioner unit 20U. Lower traveling unit 2 is configured to be self-propelled with rotation of a pair of left and right crawler belts 2a. Upper revolving unit 3 is revolvably mounted on lower traveling unit 2. Work implement 4 is axially supported on a front side of upper revolving unit 3 so as to be raised and lowered. This work implement 4 has a boom 4a, an arm 4b, a bucket 4c, hydraulic cylinders 4d-4f, and the like.

Lower traveling unit 2 and upper revolving unit 3 described above mainly constitute a work vehicle main body. Upper revolving unit 3 has a cab 5 on a front left side (a front side of the vehicle), and an engine compartment 6 accommodating an engine and a counter weight 7 on a rear side (a rear side of the vehicle). Cab 5 has an internal space IS in which an operator's seat 8 to be seated by an operator is provided. Further, an antenna 9 is provided on an upper surface of upper revolving unit 3. In the present embodiment, the front/rear and left/right sides of the vehicle are defined based on an operator to be seated on operator's seat 8 arranged in internal space IS of cab 5. In internal space IS, air conditioner unit 20U is arranged behind operator's seat 8. Further, in internal space IS, controller assembly 10 is mounted on air conditioner unit 20U. The configuration of controller assembly 10 will be described in detail later.

Figure 2:
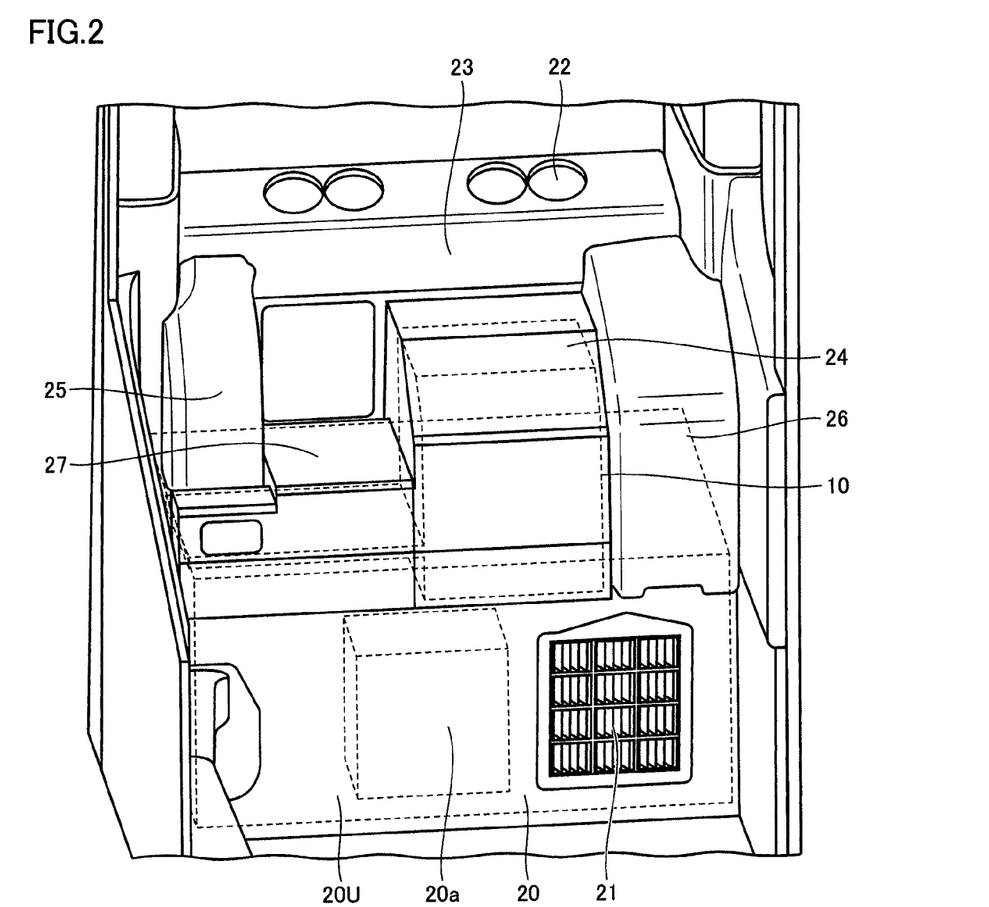
FIG. 2 is a perspective view schematically representing a configuration of an air conditioner unit arranged in an internal space of a cab of the hydraulic excavator according to one embodiment of the present invention.

Referring to FIGS. 1 and 2, air conditioner unit 20U mainly has an air conditioner main body portion 20, an inside air inlet 21, an outlet 22, and a duct unit 23. Further, referring to FIG. 9, air conditioner main body portion 20 has a ventilator 20a, a panel 20b for partitioning the ventilator 20a and the like from operator's seat 8, and flanges 20c for mounting controller assembly 10. Flanges 20c are provided respectively on left and right side walls of cab 5. Flanges 20c are provided at a position higher than an upper end of panel 20b, and a first controller main body 14 of controller assembly 10 is provided therebetween. Air is introduced from inside air inlet 21 toward ventilator 20a, and the air is sent out from ventilator 20a toward outlet 22. The air sent out from ventilator 20a passes through duct unit 23 and blows out from outlet 22.

Controller assembly 10 is mounted on an upper side of flanges 20c of air conditioner main body portion 20. In other words, air conditioner main body portion 20 is a mounted body of controller assembly 10. Controller assembly 10 is covered with a cover member 24 mounted on an upper portion of panel 20b. A drink storage 25 and a fuse cover 26 are arranged so as to sandwich cover member 24 from the left and right directions of cab 5. An upper surface portion of cover member 24 sandwiched between drink storage 25 and an upper portion of cover member 24 constitute a mounting stand 27.

Figure 3:
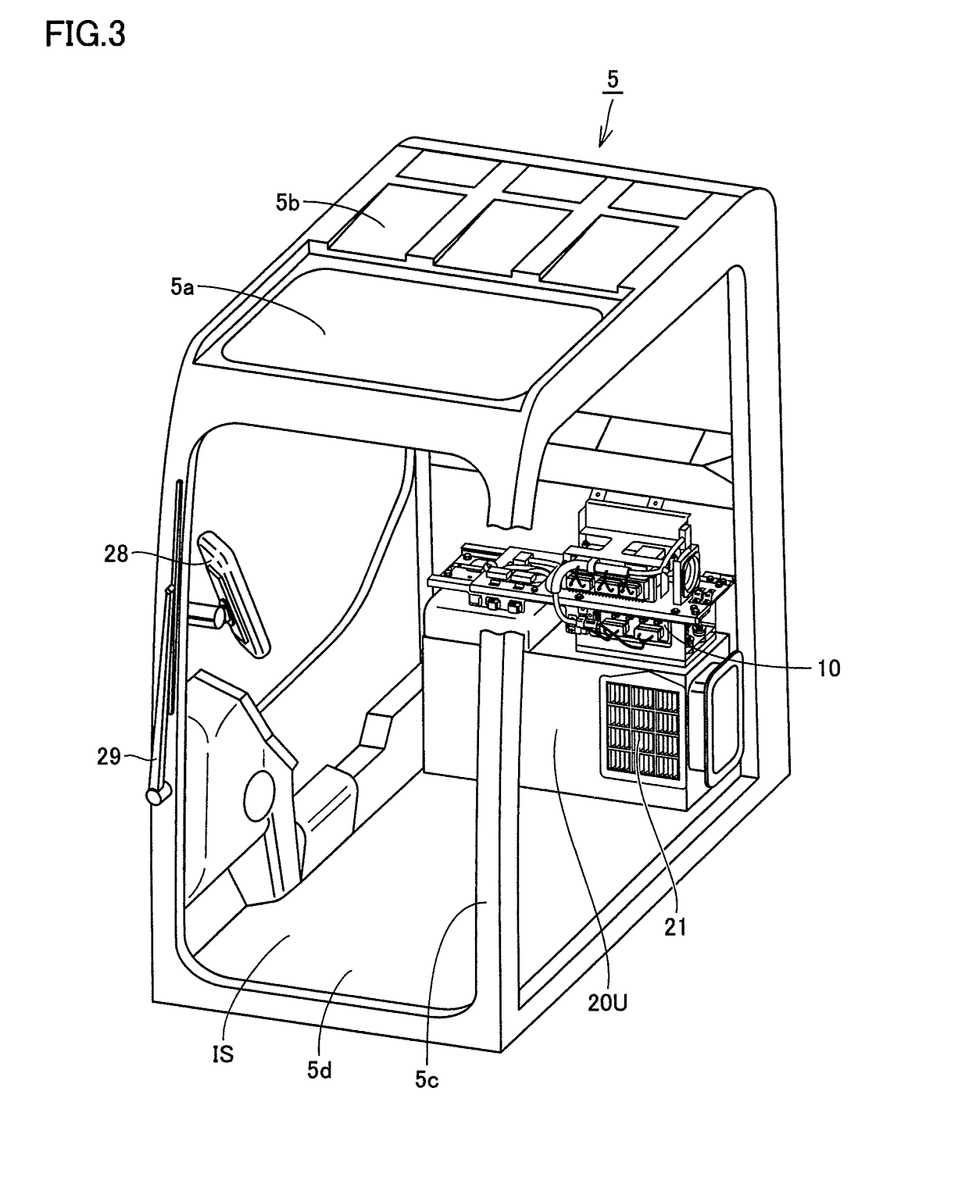
FIG. 3 is a perspective view schematically representing a configuration of the cab of the hydraulic excavator according to one embodiment of the present invention.

Referring to FIG. 3, cab 5 mainly has a skylight 5a, a top plate 5b, pillars 5c, and a floor 5d. For simplicity, FIG. 3 does not illustrate a part of pillar 5c. Further, FIG. 3 also does not illustrate the operator's seat, the cover member, and the like. Skylight 5a and top plate 5b are arranged on a roof portion of cab 5. Skylight 5a is arranged on a front side of cab 5.

Pillars 5c extend vertically between top plate 5b (roof portion) and floor 5d (floor portion) of cab 5, and supports the roof portion with respect to the floor portion. Air conditioner unit 20U is mounted on floor 5d at a rear end portion of cab 5, and controller assembly 10 is mounted on air conditioner unit 20U.

A front windshield not illustrated in the drawings is arranged between pillars 5c on the front side of cab 5. A door not illustrated in the drawings is arranged between pillars 5c on the left side of cab 5. Further, an ICT monitor 28 is supported at pillar 5c on the front right side in internal space IS of cab 5. A front windshield wiper 29 is supported at pillar 5c on the front right side so as to be able to clean a surface of the front windshield.

Figure 4:
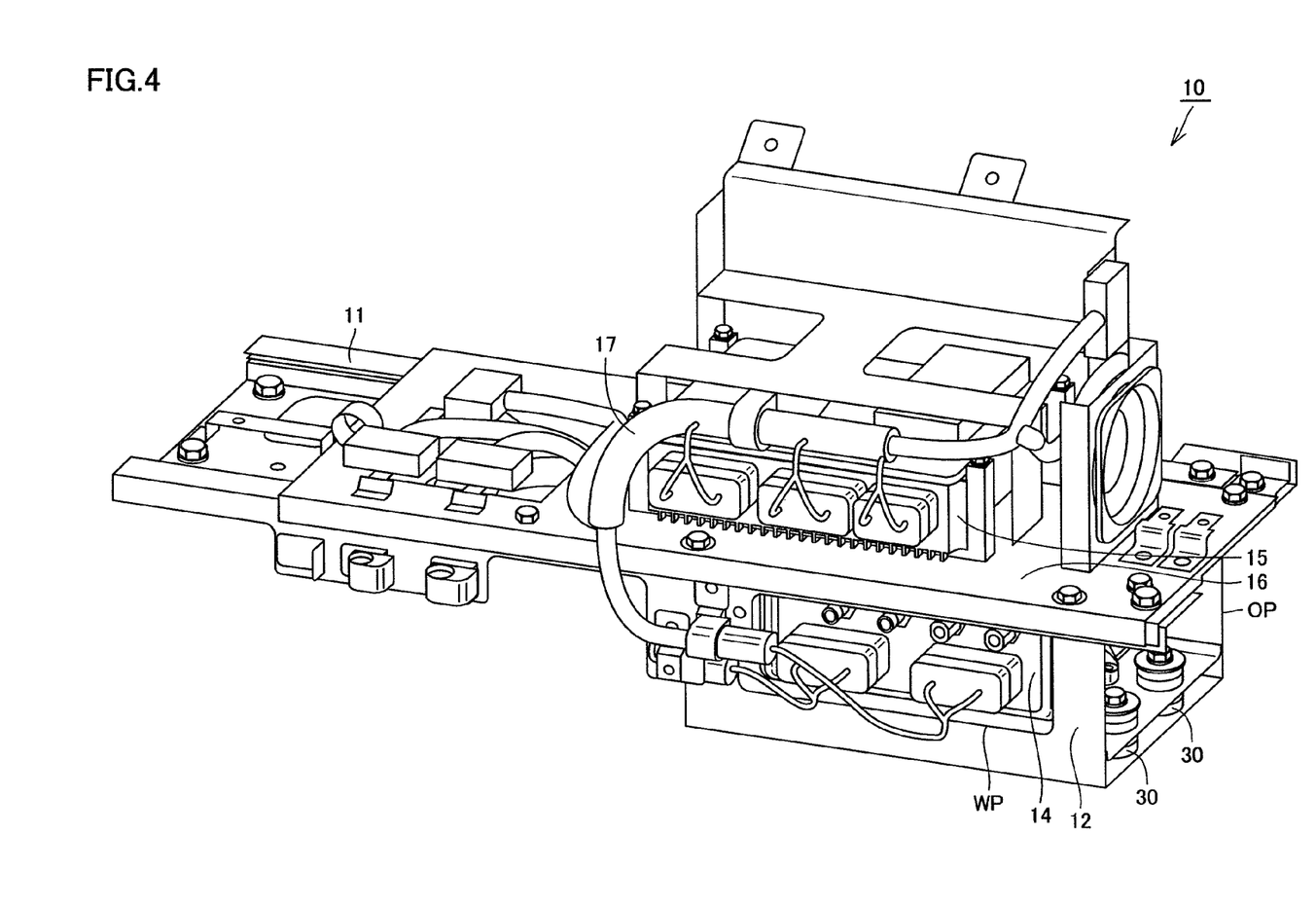
FIG. 4 is a perspective view schematically representing a configuration of a controller assembly according to one embodiment of the present invention.
Figure 5:
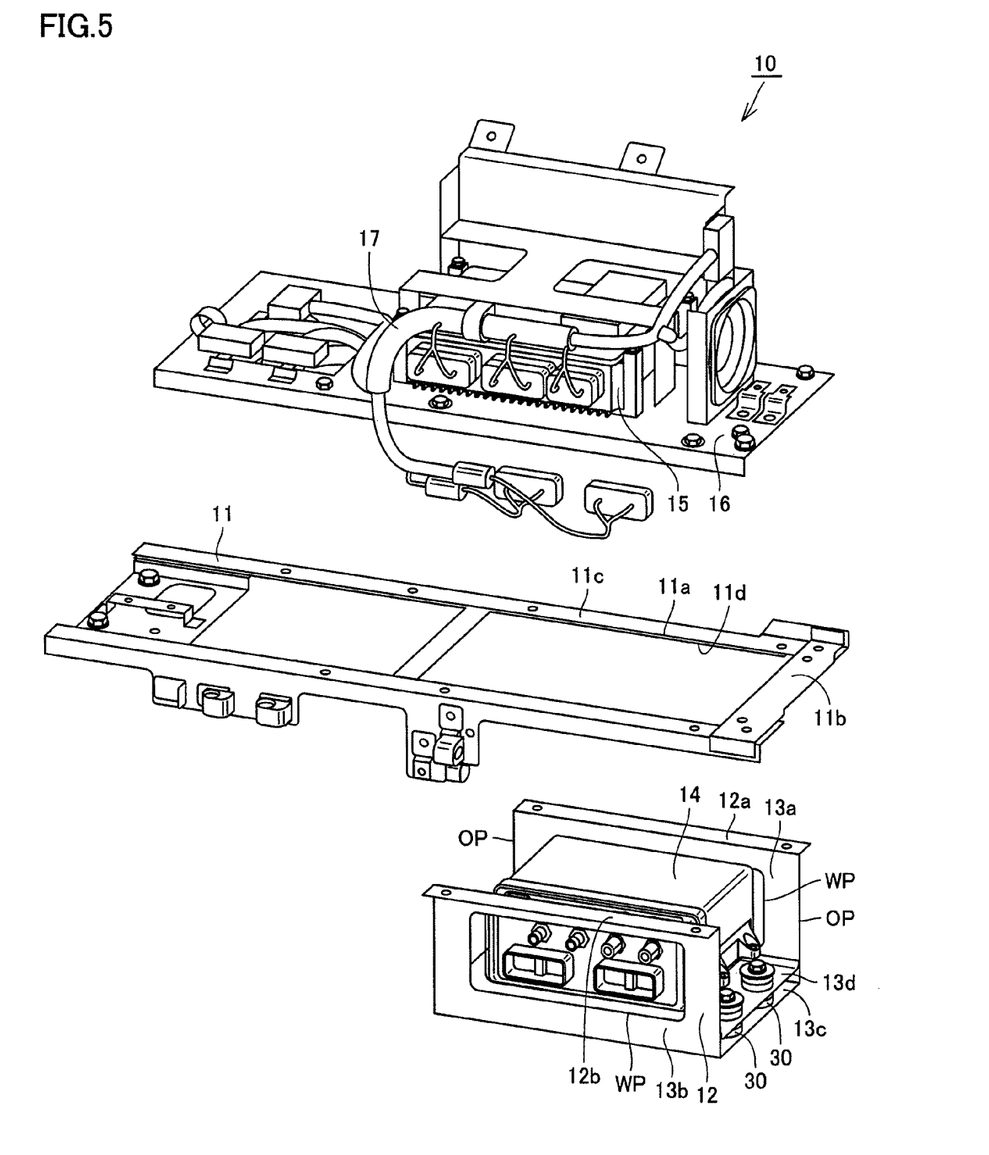
FIG. 5 is an exploded perspective view schematically representing the configuration of the controller assembly according to one embodiment of the present invention.
Figure 6:
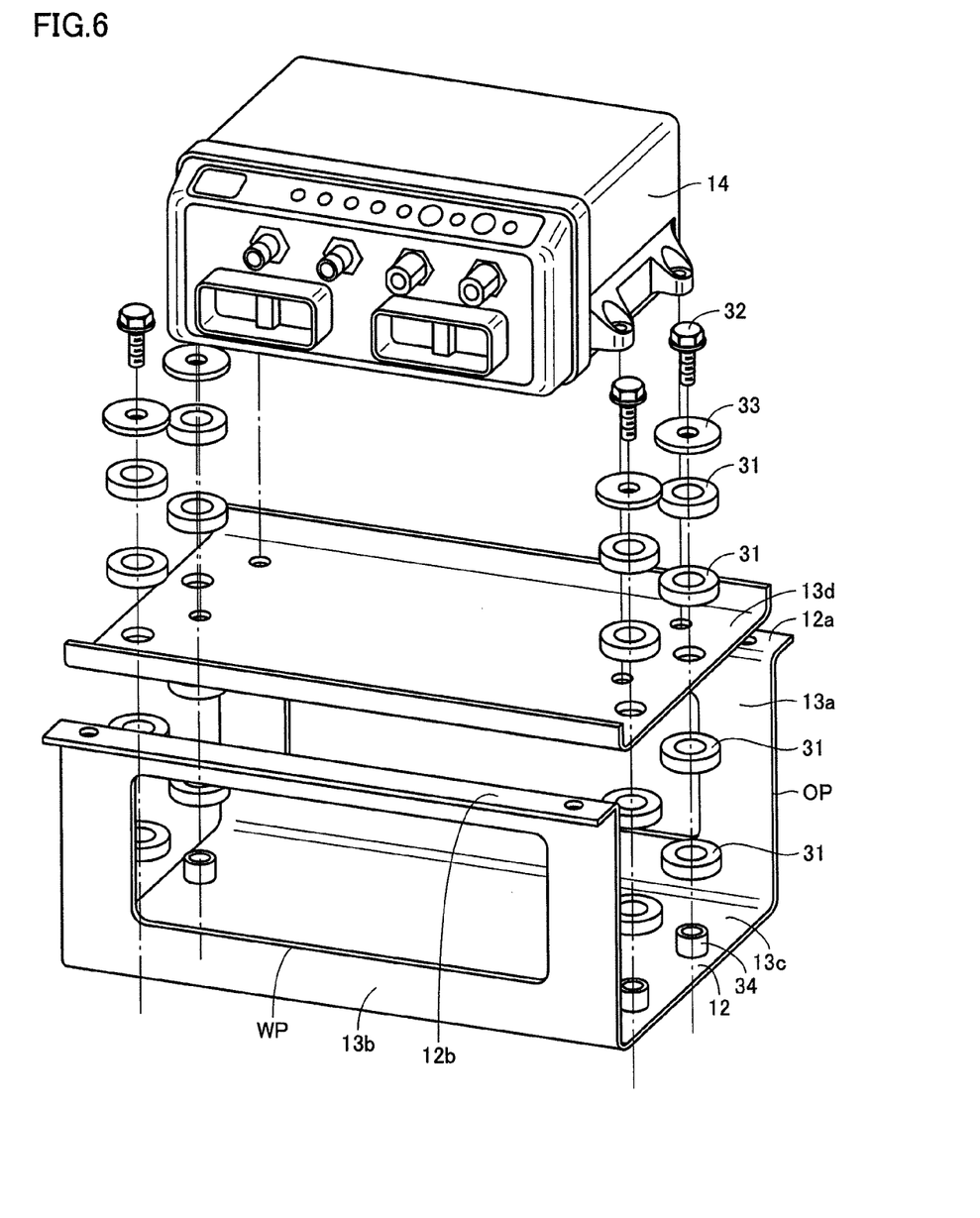
FIG. 6 is an exploded perspective view schematically representing a configuration having a controller main body mounted to a bracket of the controller assembly according to one embodiment of the present invention.

Referring to FIGS. 4-6, a configuration of controller assembly 10 will be described in detail. Mainly referring to FIGS. 4 and 5, controller assembly 10 mainly includes a base plate 11, a first bracket 12, and a first controller main body 14. Further, according to one embodiment of the present invention, controller assembly 10 also includes a second controller main body 15, a second bracket 16, and a cable 17.

Base plate 11 is adapted to support first controller main body 14 through first bracket 12 and support second controller main body 15 through second bracket 16. Further, base plate 11 is mounted on an upper portion of air conditioner main body portion 20. Base plate 11 has a substantially rectangular shape in a planar view. Base plate 11 has a through hole 11a formed in a central portion in a planar view and a frame 11b surrounding through hole 11a. Through hole 11a penetrates through upper surface 11c and lower surface 11d of frame 11b. Upper surface 11c of frame 11b is planar.

First bracket 12 is adapted to mount first controller main body 14 to base plate 11. First bracket 12 has a first flange portion 12a, a second flange portion 12b, a first side portion 13a, a second side portion 13b, and a bottom portion 13c.

First flange portion 12a and second flange portion 12b are supported on upper surface 11c of frame 11b at positions opposite to each other over through hole 11a. First flange portion 12a and second flange portion 12b are arranged on frame 11b. First flange portion 12a and second flange portion 12b extend along frame 11b.

First side portion 13a and second side portion 13b are coupled to respective longitudinal sides of first flange portion 12a and second flange portion 12b. First side portion 13a and second side portion 13b respectively pass through through hole 11a. First side portion 13a and second side portion 13b respectively have a height size larger than the thickness of frame 11b of base plate 11. Further, respective upper ends of first side portion 13a and second side portion 13b are arranged at positions higher than the upper surface of controller main body 14 in the state where controller main body 14 is mounted on bracket 12. Further, first side portion 13a and second side portion 13b respectively have window portions WP in central portions, and controller main body 14 is exposed from window portions WP.

First flange portion 12a is connected to an upper end of first side portion 13a, and a short side of first flange portion 12a extends away from second side portion 13b in the direction in which first side portion 13a and second side portion 13b are opposite to each other. Second flange portion 12b is connected to an upper end of second side portion 13b, and a short side of second flange portion 12b extends away from first side portion 13a in the direction in which first side portion 13a and second side portion 13b are opposite to each other.

Bottom portion 13c is connected to both of first side portion 13a and second side portion 13b on a side of lower surface 11d of frame 11b. Bottom portion 13c is connected to respective lower ends of first side portion 13a and second side portion 13b continuously. First controller main body 14 is mounted on bottom portion 13c. First controller main body 14 is for instance a controller for information-oriented construction and computes a position and posture of hydraulic excavator by means of satellite positioning.

First bracket 12 does not have a wall in regions OP surrounded by first side portion 13a, second side portion 13b, and bottom portion 13c in a direction orthogonal in a planar view to the direction in which first flange portion 12a and second flange portion 12b are opposite to each other. Both ends of first bracket 12 respectively have a U-shape formed by first and second flange portions 12a, 12b, first and second side portions 13a, 13b, and bottom portion 13c. Therefore, the both ends of first bracket 12 are open in the direction opposite to each other (side) and also in the upward direction.

Mainly referring to FIG. 6, a configuration of a controller module having first bracket 12 and first controller main body 14 will be described.

In one embodiment of the present invention, first controller main body 14 is mounted on a mounting plate 13d arranged on bottom portion 13c. In other words, first controller main body 14 is mounted on bottom portion 13c through mounting plate 13d. Mounting plate 13d is arranged on elastic members 31 provided on respective peripheries of bosses 34 fixed on bottom portion 13c. Boss 34 have a cylindrical shape with a threaded hole. First controller main body 14 is fixed to mounting plate 13d by screwing the threaded hole formed in attaching portions protruding on sides and threaded holes formed in bosses 34 with screws.

Vibration damping members 30 are arranged between first controller main body 14 and first bracket 12. Specifically, a plurality of vibration damping members 30 are arranged between mounting plate 13d having first controller main body 14 mounted thereon and bottom portion 13c. Mounting plate 13d is arranged on the plurality of vibration damping members 30. More specifically, four vibration damping members 30 are mounted respectively on bottom portion 13c in the vicinity of both ends of first bracket 12.

Each of the plurality of vibration damping members 30 has four elastic members 31. Elastic member 31 is formed of, for example, rubber. Four elastic members 31 have the same shape, and each has a cylindrical shape having a through hole formed in a central portion. Among four elastic members 31, lower two elastic members 31 have bosses 34 through their through holes and are stacked between bottom portion 13c and mounting plate 13d. Remaining upper two elastic members 31 are stacked between mounting plate 13d and a washer 33. Bolts 32 are screwed on bosses 34 in the state where each bolt 32 is inserted via washer 33 through through holes of stacked upper two elastic member 31, so that vibration damping members 30 are fixed to bottom portion 13c.

Referring back to FIGS. 4 and 5, second controller main body 15 is mounted to upper surface 11c of base plate 11 through second bracket 16. Second controller main body 15 is mounted on the upper surface of second bracket 16. Second controller main body 15 is arranged above first controller main body 14. Second controller main body 15 is for instance a controller for information-oriented construction and computes position and posture of work implement 4.

Second bracket 16 has a substantially rectangular shape in a planar view, and has a larger size in the short side direction than the size of frame 11b of base plate 11. Therefore, second bracket 16 can cover at least a part of upper surface 11c of base plate 11. Second bracket 16 is arranged on the upper surfaces of first flange portion 12a and second flange portion 12b which are arranged on upper surface 11c of frame 11b of base plate 11. Further, second controller main body 15 and first controller main body 14 are connected with cable 17. Cable 17 is connected to first controller main body 14 through window portion WP of second side portion 13b.

Figure 7:
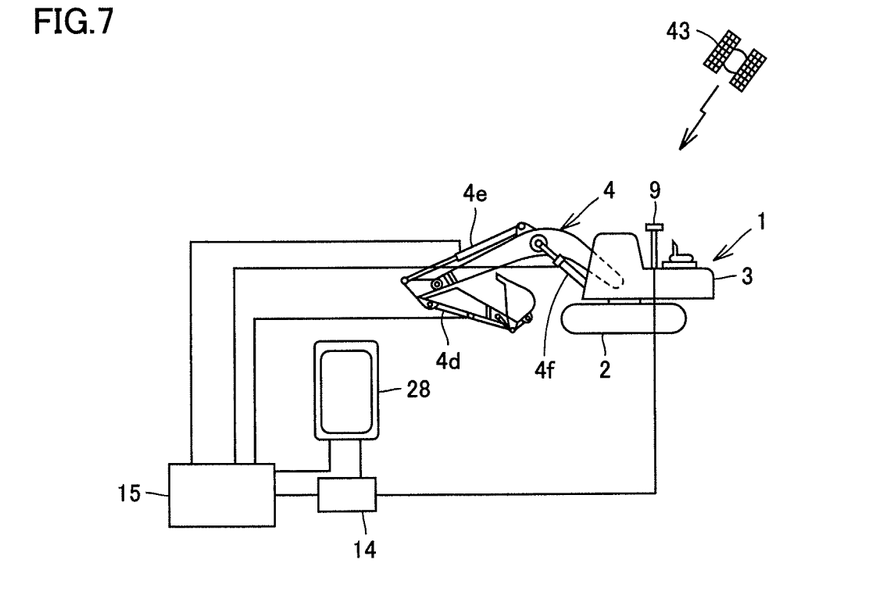
FIG. 7 schematically represents a configuration of an information-oriented construction system including the hydraulic excavator according to one embodiment of the present invention.

Next, referring to FIG. 7, the information-oriented construction system will be described.

The information-oriented construction system is a system for operating work implement 4 of hydraulic excavator 1 based on civil engineering design drawings created by three-dimensional CAD and a satellite positioning system (GNSS; Global Navigation Satellite Systems). With this information-oriented construction system, a current position of work implement 4 of hydraulic excavator 1 is updated and displayed on the civil engineering design drawing on monitor 28, so that an operator can always confirm a working condition.

In other words, with the information-oriented construction system, a position and posture of an edge of work implement 4 can be computed based on information received from a communication satellite 43 using antenna 9. Then, the civil engineering design drawing data is compared with the position and posture of the edge of work implement 4, so that work implement 4 can be operated.

First controller main body 14 is connected with monitor 28 and two antennas 9. First controller main body 14 computes positions of two antennas 9 using the satellite positioning and sends the computed position information to monitor 28.

Second controller main body 15 is connected with monitor 28 and respective actuators for work implement 4 such as a bucket cylinder 4d, an arm cylinder 4e, a boom cylinder 4f, and the like. Each of cylinders 4d, 4e, and 4f sends a signal indicating a stroke amount to second controller main body 15. Second controller main body 15 computes a position and posture of a leading end of work implement 4 based on the information. The computed information is sent to monitor 28. First controller main body 14 and second controller main body 15 are configured respectively by computer devices such as microcomputers and the like as main bodies.

Monitor 28 is a large-sized high-definition liquid crystal display and is arranged on a front side in the cab so that an operator can readily see the monitor during operation. Monitor 28 includes a third controller main body. The third controller stores civil engineering design drawing data by an external input. Monitor 28 displays information sent from first and second controller main bodies 14, 15 and drawing data information.

Next, referring to FIGS. 8-11, a method for mounting the controller assembly will be described.

Figure 8:
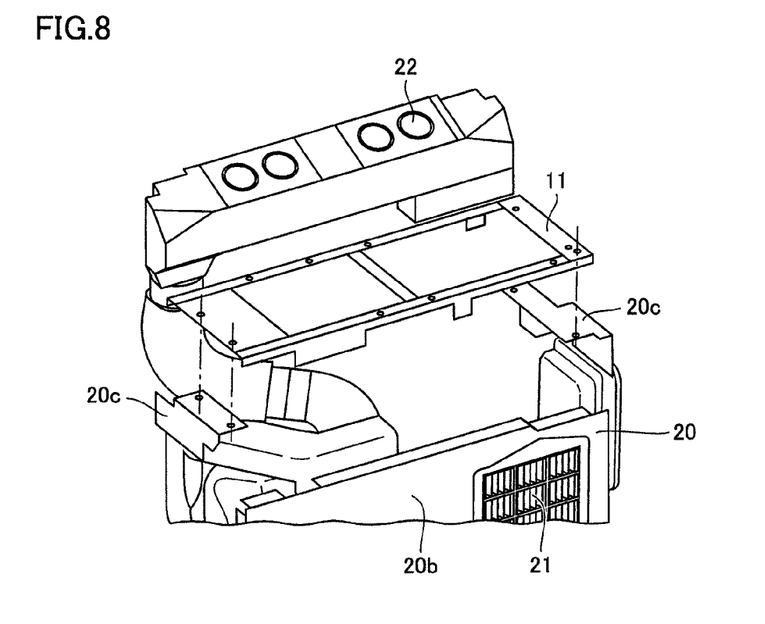
FIG. 8 is a perspective view schematically representing a method for mounting a base unit of the controller assembly according to one embodiment of the present invention.

First, referring to FIG. 8, base plate 11 is mounted on an upper portion of air conditioner main body portion 20 of air conditioner unit 20U. Specifically, base plate 11 is mounted on flange 20c constituting an upper surface of air conditioner main body portion 20, and then base plate 11 is screwed onto flange 20c.

Figure 9:
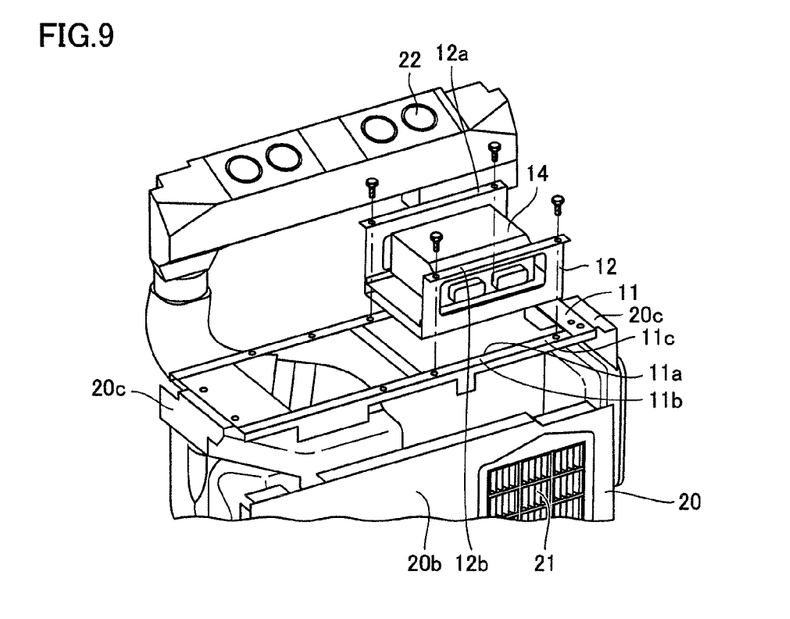
FIG. 9 is a perspective view schematically representing a method for mounting a bracket, on which a controller main body of a controller assembly according to one embodiment of the present invention is mounted, to the base unit.

Next, referring to FIG. 9, first bracket 12 having first controller main body 14 mounted thereon is attached to base plate 11 mounted on the upper portion of air conditioner main body portion 20. Specifically, first bracket 12 is inserted to through hole 11a from the side of upper surface 11c of base plate 11, and first flange portion 12a and second flange portion 12b are mounted on upper surface 11c of frame 11b of base plate 11. In this state, first flange portion 12a and second flange portion 12b are screwed onto base plate 11. First bracket 12 is arranged above inside air inlet 21 of air conditioner main body portion 20.

Figure 10:
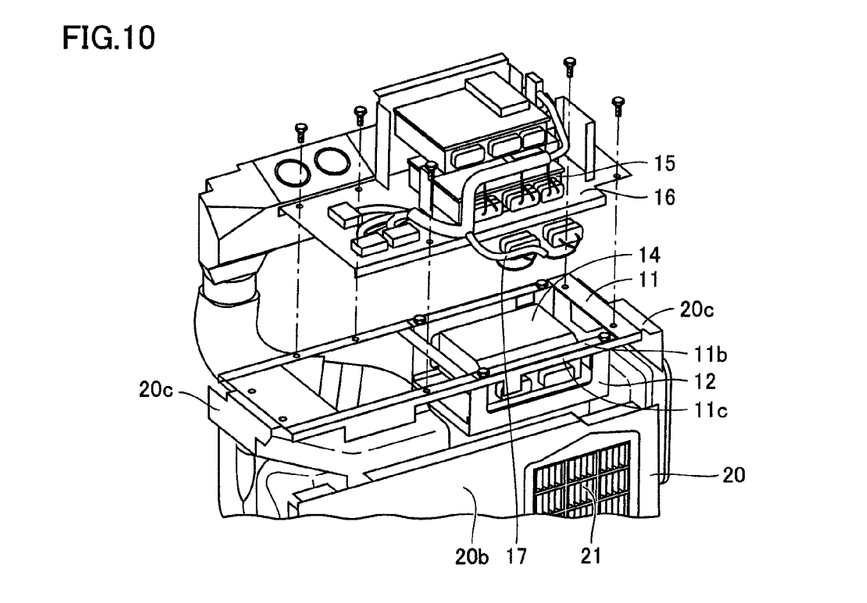
FIG. 10 is a perspective view schematically representing a method for mounting a bracket, on which another controller main body is mounted, to a base unit of the controller assembly according to one embodiment of the present invention.

Thereafter, referring to FIG. 10, second bracket 16 having second controller main body 15 mounted thereon is mounted on upper surface 11c of frame 11b of base plate 11, and second bracket 16 is screwed onto base plate 11. Second controller main body 15 is arranged above first controller main body 14 and connected to first controller main body 14 with cable 17. In other words, first controller main body 14 and second controller main body 15 are arranged to be stacked vertically.

Figure 11:
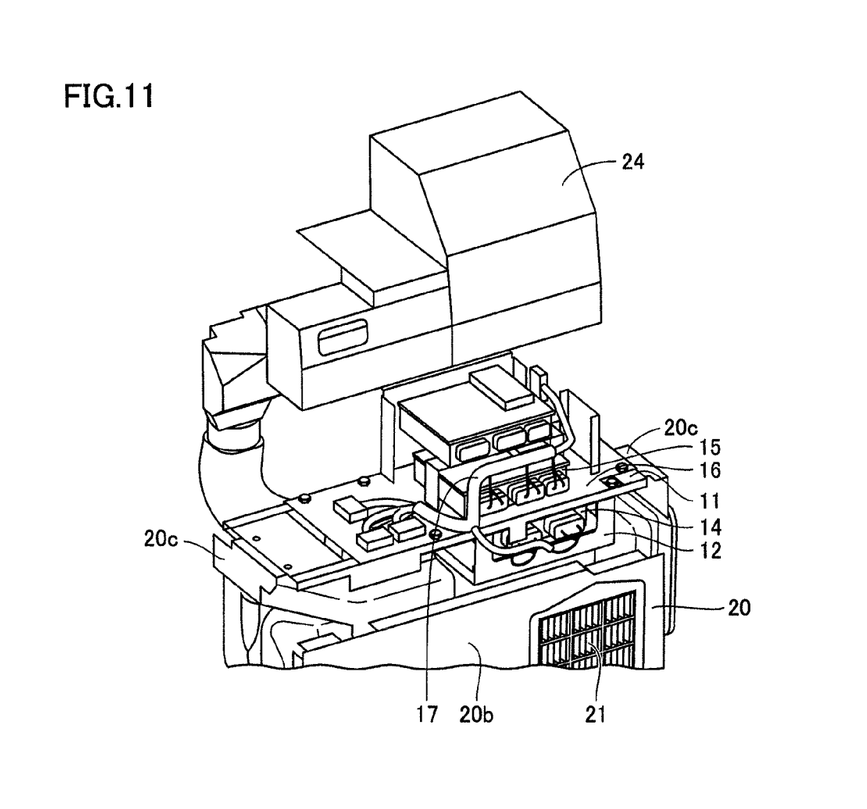
FIG. 11 is a perspective view schematically representing a method for mounting a cover member covering the controller assembly according to one embodiment of the present invention.

Further, referring to FIG. 11, cover member 24 is mounted to panel 20b so as to cover the controller assembly. The upper portion of cover member 24 accommodates second controller main body 15, and the lower portion of cover member 24 accommodates first controller main body 14.

Next, effects of the one embodiment of the present invention will be described.

According to the controller assembly of the one embodiment of the present invention, first and second flange portions 12a, 12b of first bracket 12 are supported on upper surface 11c of frame 11b of base plate 11 at positions opposite to each other over through hole 11a of base plate 11. First and second side portions 13a, 13b of first bracket 12 pass through hole 11a. Bottom portion 13c of first bracket 12 is coupled to both of first and second side portions 13a, 13b of first bracket 12 on the side of lower surface 11d of frame 11b of base plate 11. Therefore, bottom portion 13c of first bracket 12 having first controller main body 14 mounted thereon can be inserted to through hole 11a of base plate 11 from the side of upper surface 11c of frame 11b. Accordingly, first bracket 12 having first controller main body 14 mounted thereon can be readily assembled to base plate 11, so that the controller assembly can be readily assembled above air conditioner main body portion 20. Further, since first bracket 12 can be assembled to base plate 11 in the state where base plate 11 is attached to air conditioner unit 20U, the controller assembly can be readily assembled above air conditioner unit 20U.

Further, since first bracket 12 can be assembled to base plate 11, first bracket 12 can be moved relative to base plate 11. Accordingly, a position of first bracket 12 can be adjusted by moving first bracket 12 relative to base plate 11, so that the position of first bracket 12 can be readily adjusted.

In the controller assembly described above, both ends of first bracket 12 formed by first and second flange portions 12a, 12b, first and second side portions 13a, 13b, and bottom portion 13c are open in the direction opposite to each other. Accordingly, first controller main body 14 can be readily mounted to bottom portion 13c.

The controller assembly described above includes vibration damping members 30 arranged between first controller main body 14 and first bracket 12. Therefore, vibration damping members 30 can suppress vibrations transmitted from first bracket 12 to controller main body 14. Accordingly, first controller main body 14 can be protected from vibrations. Since vibration damping members 30 are assembled to controller assembly in advance, the controller assembly can be readily assembled to air conditioner main body portion 20.

Cab 5 of the one embodiment of the present invention includes the controller assembly in internal space IS where operator's seat 8 to be seated by an operator is arranged. Therefore, cab 5 of the work machine having the controller main body in internal space IS can be provided.

In cab 5 described above, the controller assembly can be mounted to the upper portion of air conditioner main body portion 20 arranged behind operator's seat 8. Since a space is provided on an upper portion of air conditioner main body portion 20 arranged behind operator's seat 8, arranging the controller assembly in this space allows the space in internal space IS to be utilized effectively.

Hydraulic excavator 1 of the one embodiment of the present invention includes cab 5 described above. Therefore, hydraulic excavator 1 including cab 5 described above can be provided.

It should be understood that the embodiment disclosed herein is illustrative and non-restrictive in every respect. The scope of the present invention is defined by the terms of claims, rather than the description of the embodiments set forth above, and is intended to include any modifications within the scope and meaning equivalent to the terms of the claims.

REFERENCE SIGNS LIST 1 hydraulic excavator; 2 lower traveling unit; 2a crawler belt; 3 upper revolving unit; 3a engine; 3b swing motor; 4 work implement; 4a boom; 4b arm; 4c bucket; 4d bucket cylinder; 4e arm cylinder; 4f boom cylinder; 5 cab; 5a skylight; 5b top plate; 5c pillar; 5d floor; 6 engine compartment; 7 counter weight; 8 operator's seat; 9 antenna; 10 controller assembly; 11 base plate; 11a through hole; 11b frame; 11c upper surface; 11d lower surface; 12, 16 bracket; 12a first flange portion; 12b second flange portion; 13a first side portion; 13b second side portion; 13c bottom portion; 13d mounting plate; 14, 15 controller main body; 17 cable; 20 air conditioner main body portion; 20a ventilator; 20b panel; 20c flange; 20U air conditioner unit; 21 inside air inlet; 22 outlet; 23 duct unit; 24 cover member; 25 drink storage; 26 fuse cover; 27 mounting stand; 28 monitor; 29 front windshield wiper; 30 vibration damping member; 31 elastic member; 32 bolt; 33 washer; 34 boss; 43 communication satellite; IS internal space.

The invention claimed is:

1. A controller assembly to be deployed in a cab for a work machine, comprising:

a base plate including a through hole and a frame surrounding said through hole, said frame having an upper surface and a lower surface;

a bracket including first and second flange portions supported on the upper surface of said frame at positions opposite to each other over said through hole, first and second side portions coupled respectively to said first and second flange portions and passing through said through hole, and a bottom portion coupled to both of said first side portion and said second side portion on a side of the lower surface of said frame;

a first controller main body mounted on said bottom portion of said bracket; and a second controller main body provided on an upper side of said frame, wherein distal most opposite ends of said first and second flange portions, distal most opposite ends of said first and second side portions, and distal most opposite ends of said bottom portion define openings such that first and second distal most opposite ends of the bracket are open.

2. The controller assembly according to claim 1, further comprising:

a vibration damping member arranged between said first controller main body and said bracket.

3. A cab for a work machine having an internal space in which an operator's seat to be seated by an operator is arranged, comprising:

a controller assembly according to claim 1 provided in said internal space.

4. The cab for the work machine according to claim 3, further comprising:

an air conditioner main body portion arranged behind said operator's seat in said internal space, wherein said base plate of said controller assembly is mounted on the upper portion of said conditioner main body portion.

5. A work machine, comprising a cab for the work machine according to claim 3.

* * * * *